(12) United States Patent
Bachmann et al.

(10) Patent No.: US 10,010,210 B2
(45) Date of Patent: Jul. 3, 2018

(54) DOUBLE RAMP FOR CLOSING A RECEPTACLE HOLDER

(71) Applicant: NESTEC S.A., Vevey (CH)

(72) Inventors: Michael Bachmann, Butschwil (CH); Stefan Schai, Wil (CH); Oliver Stephan, Winterthur (CH)

(73) Assignee: Nestec S.A., Vevey (CH)

( * ) Notice: Subject to any disclaimer, the term of this patent is extended or adjusted under 35 U.S.C. 154(b) by 404 days.

(21) Appl. No.: 14/654,310

(22) PCT Filed: Dec. 19, 2013

(86) PCT No.: PCT/EP2013/077276
§ 371 (c)(1),
(2) Date: Jun. 19, 2015

(87) PCT Pub. No.: WO2014/096123
PCT Pub. Date: Jun. 26, 2014

(65) Prior Publication Data
US 2015/0327711 A1 Nov. 19, 2015

(30) Foreign Application Priority Data
Dec. 20, 2012 (EP) ..................................... 12198336

(51) Int. Cl.
*A47J 31/44* (2006.01)
*A47J 31/22* (2006.01)

(52) U.S. Cl.
CPC ..................................... *A47J 31/22* (2013.01)

(58) Field of Classification Search
CPC ........ A47J 31/00; A47J 31/0668; A47J 31/18; A47J 31/44
(Continued)

(56) References Cited

U.S. PATENT DOCUMENTS 2,617,352 A * 11/1952 Olson ................... A47J 31/057
99/305
5,870,943 A * 2/1999 Levi ..................... A47J 31/0647
99/287
(Continued)

FOREIGN PATENT DOCUMENTS

WO 2006112691 10/2006
WO 2008148834 12/2008
WO 2012069986 5/2012

*Primary Examiner* — Michael Laflame, Jr.
(74) *Attorney, Agent, or Firm* — K&L Gates LLP

(57) ABSTRACT

A receptacle holding unit includes a first part and a second part cooperating with the first part; a cavity for receiving a receptacle containing an ingredient for preparing a beverage by a device, the cavity being delimited by at least one of the first and second parts; and a driving device for relatively moving the second part towards the first part into a closed position and relatively apart from the first part into an open position. The driving device includes an actuator and a transmission having a helicoidal ramp arrangement cooperating with a connector member for converting a translational movement into a rotational movement or vice versa. When the actuator actuates the transmission, the first and second parts are driven together or apart. The ramp arrangement includes two ramps spaced apart and generally parallel between which the connector member relatively moves along the ramp arrangement.

19 Claims, 3 Drawing Sheets

(58) Field of Classification Search
USPC .................................................. 99/279–323
See application file for complete search history.

(56) References Cited

U.S. PATENT DOCUMENTS

| | | | |
|---|---|---|---|
| 5,911,810 A * | 6/1999 | Kawabata ................ | A47J 31/34 99/289 P |
| 6,253,664 B1 * | 7/2001 | Giannelli ............ | A47J 31/3614 99/287 |
| 2005/0126398 A1 * | 6/2005 | Ascaso Lopez .... | A47J 31/0663 99/279 |
| 2010/0203198 A1 * | 8/2010 | Yoakim ................... | A47J 31/22 426/80 |

* cited by examiner

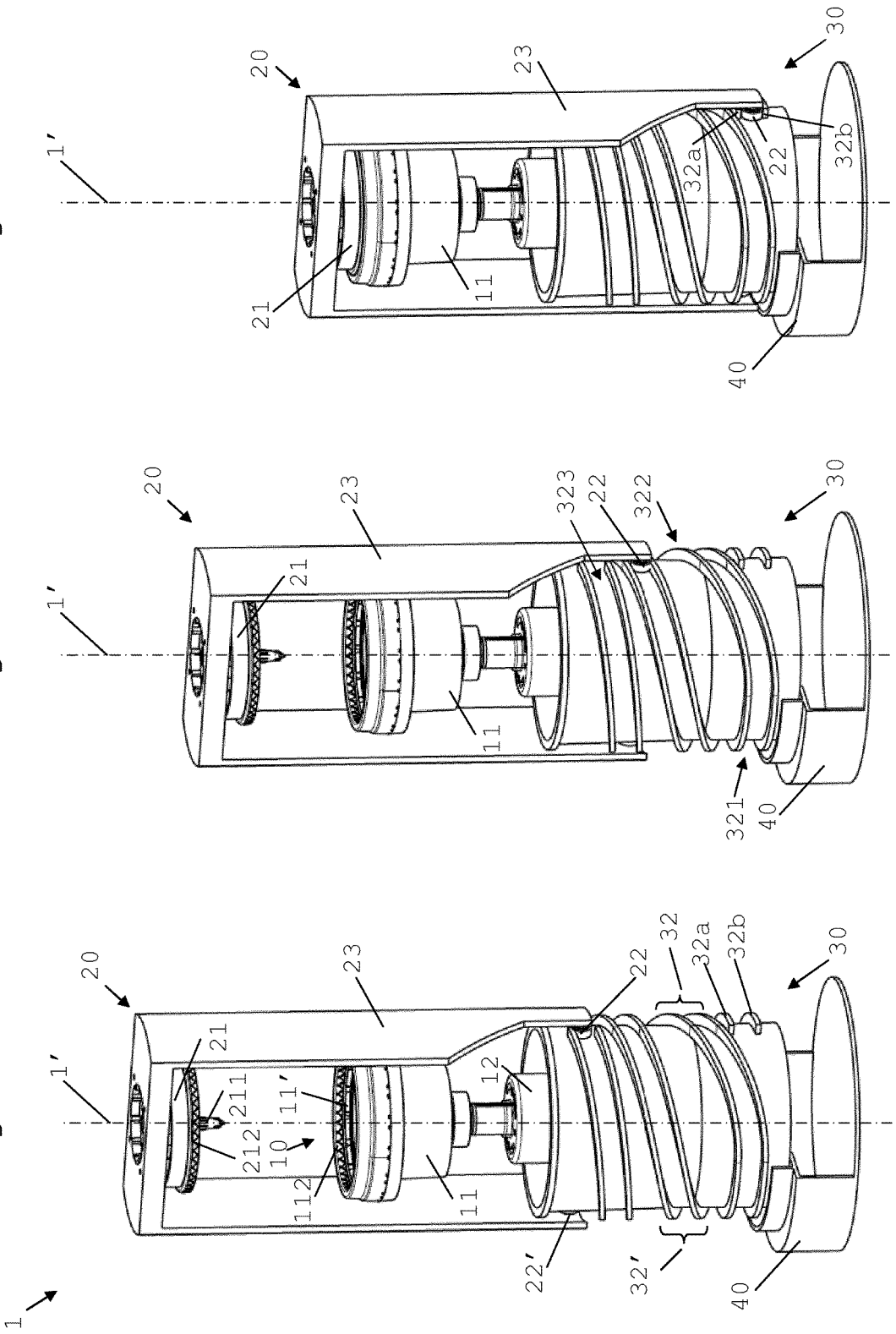

DOUBLE RAMP FOR CLOSING A RECEPTACLE HOLDER

CROSS REFERENCE TO RELATED APPLICATIONS

The present application is a National Stage of International Application No. PCT/EP2013/077276, filed on Dec. 19, 2013, which claims priority to European Patent Application No. 12198336.5, filed on Dec. 20, 2012, the entire contents of which are being incorporated herein by reference.

FIELD OF THE INVENTION

The field of the invention pertains to beverage preparation devices using receptacles, such as capsules, of an ingredient of the beverage to be prepared, in particular to devices arranged to prepare the beverage by circulation of a liquid into the ingredient receptacle and centrifugation thereof, typically to brew the beverage in the ingredient receptacle and extract the beverage therefrom.

For the purpose of the present description, a "beverage" is meant to include any human-consumable liquid substance, such as tea, coffee, hot or cold chocolate, milk, soup, baby food, etc ... A "receptacle" is meant to include any container such as a packaging for containing a pre-portioned beverage ingredient, e.g. a flavouring ingredient, the packaging forming an enclosure, e.g. a capsule, of any material, in particular an airtight or pervious material, porous or non-porous material, e.g. plastic, aluminium, recyclable and/or biodegradable packagings, and of any shape and structure, including soft pods or rigid cartridges for containing the ingredient.

BACKGROUND ART

Certain beverage preparation machines use capsules containing ingredients to be extracted or to be dissolved and/or ingredients that are stored and dosed automatically in the machine or else are added at the time of preparation of the drink. Some beverage machines possess filling means that include a pump for liquid, usually water, which pumps the liquid from a source of water that is cold or indeed heated through heating means, e.g. a thermoblock or the like.

Especially in the field of coffee preparation, machines have been widely developed in which a capsule containing beverage ingredients is inserted in a brewing device. The brewing device is tightly closed about the capsule, water is injected at the first face of the capsule, the beverage is produced in the closed volume of the capsule and a brewed beverage can be drained from a second face of the capsule and collected into a receptacle such as a cup or glass.

Brewing devices have been developed to facilitate insertion of a "fresh" capsule and removal of the capsule upon use. Typically, such brewing devices comprise two parts relatively movable from a configuration for inserting/removing a capsule to a configuration for brewing the ingredient in the capsule. The actuation of the movable part of the brewing device may be motorized. Such a system is for example disclosed in EP 1 767 129. In this case, the user does not have to provide any manual effort to open or close the brewing device. The brewing device has a capsule insertion passage provided with a safety door assembled to the movable part of the brewing device via a switch for detecting an undesired presence of a finger in the passage during closure and prevent injuries by squeezing. The actuation of the movable part of the brewing device may be manual. WO 2009/043630 discloses a beverage preparation machine including a brewing unit having a front part with a passage for inserting a capsule into the brewing unit. The front part is arranged to telescope out of the machine's housing for uncovering the passage for inserting a capsule into the brewing unit and telescopes into the brewing unit for sliding the passage under the housing and thus covering the passage by the housing. A pivotable arched handle is configured for driving the front part manually. WO 2005/004683 and WO 2007/135136 disclose a device comprising a frame, a fixed holding part for the capsule, a movable holding part which is mounted relative to the frame in a sliding relationship, one or two knuckle joint mechanisms that provide a mechanical system for closing in a steady and fluid-tight manner the holding parts about the capsule while also resisting to the counter-force acting while re-opening and generated by the internal brewing pressure, and a handle for directly levering the knuckle joint mechanism.

The preparation of a beverage by using centrifugation is also known. Such beverage preparation includes: providing a beverage (flavoring) ingredient, e.g. as powder and/or leaves, in a receptacle, e.g. in a capsule; circulating liquid into the receptacle and rotating the receptacle at sufficient speed to ensure interaction of the liquid with the ingredient while creating a gradient of pressure of liquid in the receptacle. Such pressure increases gradually from the centre towards the periphery of the receptacle. As liquid traverses the ingredient, e.g. coffee bed, extraction of the ingredient, e.g. coffee compounds, takes place and a liquid extract is obtained that flows out at the periphery of the receptacle. WO2008/148601 describes a possible example of a device using such centrifugal principle. In this case, the ingredient receptacle is a sealed capsule which is opened before its use. Hot water is fed in the centre of the capsule via a water interfacing part comprising a water injector aligned in the rotation axis. The receptacle is held in a capsule holder which is rotated by means of a rotary motor. Both the liquid interfacing part and the capsule holding part are mounted along roller bearings. The beverage is extracted from the capsule by a plurality of peripheral needles that creates openings through a lid of the receptacle. As the capsule is centrifuged about its rotation axis, hot water passes through the beverage ingredient, interacts with it to produce a liquid extract and the resulting liquid extract traverses, under the effect of the centrifugal forces, the peripheral openings and is projected against an impact wall of the collector. The liquid extract, thus constituting the beverage, is then drained through a beverage duct of the device and collected into a recipient such as a cup. WO2008/148650 further describes a device wherein a flow restriction is created downstream of the receptacle, in particular a capsule, for example, by a valve system which opens or enlarges under the pressure created by the centrifuged liquid leaving the receptacle. The valve system can be formed by a mobile restriction part of the device which is elastically urged against a rim portion of the capsule. U.S. Pat. No. 5,566,605 relates to a centrifugal type extraction cell having a deformable sealing joint for hot beverage preparation machine. The cell comprises a drum and a cover defining with the drum an internal volume. The cover is connected to the drum by attachment ears that engage in ramps. In these prior art devices, the water interfacing part which supplies the receptacle with water and the holding part which holds the receptacle are rotatable along frame portions of the device which are secured together by a closure mechanism such as a bayonet system or the like. The holding part is generally mounted on a frame part via at least one roller bearing. The liquid interfacing part is also generally part of a frame part also mounted along at least one roller bearing. When the device is rotated at high speed during centrifugation, the liquid extract creates important axial and radial forces which tend to separate these rotating parts.

A problem of the prior art devices comes from the difficulty to provide a closure of the device about the receptacle that properly resists to axial and radial forces created by the centrifugal pressure of the liquid. Some systems have been proposed to provide a solution to such problems, notably as disclosed in co-pending applications PCT/EP12/063654, PCT/EP12/063659 and PCT/EP12/063660.

Irrespectively of the extraction process itself it has also been proposed to facilitate the handling of receptacles by system for extracting them, in particular by motorizing the opening and/or closure of the extraction system for inserting and/or removing a receptacle. Examples of such systems are for example disclosed in EP 1 767 129, WO 2012/025258, WO 2012/025259 and EP 12157379.4.

SUMMARY OF THE INVENTION

The invention relates to a receptacle holding unit and to a device including such a unit for preparing a beverage from at least one ingredient and dispensing such prepared beverage. For instance, the device is a coffee, tea, chocolate, cacao, milk or soup preparation machine. In particular, the device is arranged for preparing within a beverage processing module that includes the receptacle holding unit, a beverage by passing hot or cold water or another liquid through a receptacle held in the unit, such as a held capsule, containing an ingredient, such as a flavouring ingredient, of the beverage to be prepared, such as ground coffee or tea or chocolate or cacao or milk powder.

Such beverage preparation typically includes the mixing of a plurality of beverage ingredients, e.g. water and milk powder, and/or the infusion of a beverage ingredient, such as an infusion of ground coffee or tea with water. For instance, a predetermined amount of beverage is formed and dispensed on user-request, which corresponds to a serving. The volume of such a serving may be in the range of 25 to 250 ml, e.g. the volume for filling a cup or mug, depending on the type of beverage. Formed and dispensed beverages may be selected from ristrettos, espressos, lungos, cappuccinos, café latte, americano coffees, teas, etc . . . For example, a coffee machine may be configured for dispensing espressos, e.g. an adjustable volume of 20 to 60 ml per serving, and/or for dispensing lungos, e.g. a volume in the range of 70 to 200 ml per serving.

An aspect of the invention relates to a receptacle holding unit for a device for preparing a beverage from an ingredient contained in a receptacle, in particular by circulating a liquid into such receptacle and centrifugally driving such receptacle.

The unit comprises: a first part and a second part cooperating with the first part; a cavity for receiving the receptacle, the cavity being delimited by at least one of the first and second parts; a driving device for relatively moving the second part towards the first part, in particular along a longitudinal axis, into a closed position for securing the receptacle in the cavity and relatively apart from the first part into an open position for inserting said receptacle into the cavity and/or for removing the receptacle therefrom. The driving device comprises an actuator and a transmission that has a helicoidal ramp arrangement cooperating with a connector member for converting a translational movement into a rotational movement or vice versa.

The actuator may be manually driven or electrically powered. The actuator can be a motor.

The helicoidal ramp arrangement is mounted to the first part and the connector member is mounted to the second part so that, when the actuator actuates the transmission, the first and second parts are driven together or apart by the helicoidal ramp arrangement cooperating with the connector member.

Optionally, the driving device comprises a plurality of pairs formed of a helicoidal ramp arrangement and a connector member. For example the driving device comprises: two such pairs, e.g. two pairs having two helicoidal ramp arrangements separated by an angle of 180° deg about the axis of the helicoidal ramp arrangement, or three such pairs, e.g. three pairs with three helicoidal ramp arrangements relatively separated by an angle of 120° deg, or four such pairs, e.g. four pairs with four helicoidal ramp arrangements relatively separated by an angle of 90° deg.

Hence, such a receptacle holding unit may be static or dynamic during beverage preparation. For instance, the receptacle holding unit is arranged to rotate, in particular at elevated speed, e.g. above 1000 or 2000 RPM, to enhance processing of the ingredient in the receptacle, in particular mixing thereof with a liquid circulated into the receptacle. In the latter configuration, the first and second parts move together during beverage preparation in a manner to be angularly fixed one to another about the axis of relative rotation. The axis of relative rotation may be the same as or different to the axis of relative rotation of the first and second parts into and out of the connection configuration. Hence, the holding unit may be connected to an actuator for rotatably driving the unit to prepare a beverage. The first and second parts of the unit can be rotatably driven altogether (e.g. en bloc) about an axis that is generally identical to the axis of the helicoidal ramp arrangement. The first or the second part may be actuatable by a motor to drive the unit altogether about this axis. The actuated part preferably drives the other part.

Depending on the type of receptacle to be used in the receptacle holding unit, e.g. closed or partly closed receptacles, the unit may have a piercing device driven by the driving device for piercing such a receptacle. The piercing device may be driven along the direction of relative movement of the first and second parts. Hence, the driving of the piercing device can be integrated in the same movement of the driving device as for driving the first and second parts.

For instance, the piercing device is assembled to and held by the second part. In such a configuration, the piercing device will be generally linked to the second part and generally follow the relative movement of the second part.

The piercing device may have a member extending along the axis of the helicoidal ramp arrangement and/or one or more members that are off-set relative to this axis, in particular in a generally circular arrangement about such an axis.

The piercing device may have a axial piercing element extending along this axis, such as a centrally located piercing element. The axial piercing element comprises in particular a channel for guiding a liquid into said receptacle and/or out thereof.

Liquid may be injected into the receptacle and/or drained out from the receptacle through the opening(s) formed by the axial and/or off-axis piercing element(s). For example, the liquid may be circulated into and/or from the receptacle via a channel located in the piercing elements and/or adjacent to the piercing element(s). One or more piercing elements may also be withdrawn from the receptacle to allow the passage of liquid via the opening(s) formed by the piercing element(s) in the receptacle.

In accordance with the invention, the ramp arrangement comprises two spaced apart and generally parallel first and second ramps inbetween which the connector member relatively moves along the ramp arrangement.

Hence, the connector member is secured inbetween the ramp arrangements by two facing ramps (on each side of the connector member) so that forces can be transmitted from and to the connector member from either side (typically from above and from below) to the helicoidal ramp arrangement. Hence, the transmission can work in both direction (against opening or closure), whether the first and second parts are being opened or closed.

The connector member can be urged against the first ramp in the closed position and against the second ramp in the open position. For instance, the connector member may be urged against the first ramp during closure to pull a movable cover part connected to the first or the second part from an open position into a closed position, such as a cover part that is biased into an open position by a resilient device connected to a cover support. The connector member may rest on the second ramp when the first and second parts are moved between the open and closed positions.

The helicoidal ramp arrangement can have a first portion with a smaller slope and a second portion with a greater slope for adjusting a transmission speed and force between the ramp arrangement and the connector member to adjust a resulting speed and force of the first and second parts moving between their open and closed positions.

The speed and force of the first and second parts may thus be adjusted according to the required need by adjusting the slope of the ramp arrangement cooperating with the connecting member. For instance, when a receptacle needs to be pierced, force is more important than speed. When the first and second portions are moved from a first spacing to a second spaced during which no particular force is required, speed may be more important than force. At the end of the movement of the first and second parts, the speed can be reduced to avoid a shock at the end of the travel.

For instance, the first portion with a smaller slope is at a slope to the plane orthogonal to the axis of the helicoidal ramp arrangement in the range of 0 to 15%. The slope of the second portion to the orthogonal plane may be greater than the slope of the first portion, e.g. between 50 and 150%. When the helicoidal ramp arrangement has a diameter in the range of 50 to 150 mm, e.g. 75 to 125 mm, the first portion may have a pitch in the range of 0 to 15 mm, e.g. 0 to 8 mm, and the second portion may have a pitch that is greater than the pitch of the first portion, such as 30 to 125 mm e.g. 50 to 75 mm. These values may of course be proportionally increased or decreased.

The ramp may have variable slope portions (spline). The slope (or pitch) of the helicoidal ramp arrangement may progressively increase (or decrease) or change incrementally. For instance, an intermediate ramp portion may be provided between the first and second portions. Such an intermediate ramp portion may have a progressive slope increasing from a value in a first range of 0 to 15% to a second value in a second range of 50 to 150 mm, the first and second values corresponding typically to the values of the slopes of the first and second ramps.

The same considerations apply mutatis mutandis to the optional (smaller slope) third portion mentioned below and its relation to the (greater slope) second portion.

The first portion can form an end portion of the ramp arrangement which contacts the connector member in the open or closed position. The ramp arrangement may include a third portion having a slope that is smaller than the greater slope of the second portion, in particular a slope that is equal to the smaller slope of the first portion. The third portion can form an end portion of the ramp arrangement that is opposite to the first portion.

The second portion can extend from the first portion and form at least a middle portion of the ramp arrangement.

The driving device typically has a controller for controlling the actuator, the controller being preferably configured to detect when the connector member reaches an end position on the helicoidal ramp arrangement and stop the actuator, in particular at an end position along the ramp arrangement corresponding to the open or the closed position. Optionally, the ramp arrangement is associated with one or more end position switches that are connected to the controller for detecting the presence of the connector member at the end position(s) or the controller is arranged to monitor a parameter, such as the current or the voltage, of a power consumption of the actuator to determine the presence of the connector member at the end position(s). It is also possible to arrange an indirect detection of the relative position of the ramp arrangement and the connector member, for instance by detecting a relative position of the first and second parts or by measuring a duration of the closure or opening movement thereof.

The first and the second parts can be secured in the open or the closed position by maintaining the actuator of the driving device activated.

The transmission can be a one-way transmission that prevents the first and second parts from moving between the open and the closed positions without correspondingly powering the actuator of the driving device.

Hence, it is possible but not required, to use a fastening device, such as a latch or a lock or equivalent means, to secure the first and second parts in a closed position during beverage preparation, e.g. to resist a pressure rise urging the first and second parts apart.

The first and second parts may be relatively moved along a path from the open to the closed position, the first part and the helicoidal ramp arrangement being movable as a unit along path and/or the second part and the connector member being movable as a unit along the path. Optionally, the helicoidal ramp arrangement is rotatably mounted about the path to the first part. Movable as a "unit" means that the elements of one unit (e.g. the helicoidal ramp arrangement and the first part as one unit, and/or the connector member and the second part as one unit) follow each other at a generally constant distance when moved along path, the elements being allowed to move relative to each other in a direction different to the direction of the path, for example they can relatively pivot about the path.

The first and second parts can be relatively moved along a path from the open to the closed position and vice versa, the helicoidal ramp arrangement being rotatable about the path and the connector member being translatable along the path or vice versa.

The second part typically has a frame to which the connector member is mounted, the connector member forming in particular a toothed or plain wheel cooperating with the ramp arrangement that is optionally correspondingly toothed or plain. The connector member may also form a plain pin or rod that follows the shape of the ramp arrangement.

The first part can have a first receptacle engagement device that is rotatable about an axis which is generally parallel to an axis of the helicoidal ramp arrangement.

The second part may have a second receptacle engagement device that is rotatably mounted to the connector member, in particular via a frame and/or a ball bearing. Optionally, the second receptacle engagement device comprises or defines a fluid outlet for circulating a fluid to a receptacle contained in the cavity and/or comprises or defines a fluid outlet for guiding an extract from a receptacle contained in the cavity.

The fluid outlet may be connected to a fluid line that is joined to the outlet via a rotatable seal.

For instance, the second receptacle engagement device is provided with one or more peripheral piercing members to form one or more corresponding openings at a periphery of a receptacle. By mounting the engagement device on a pivotable bearing, the engagement device can follow a rotation of the receptacle during piercing so that the receptacle is not laterally torn by a relative rotation of such peripheral piercing member(s) penetrating into or located in the receptacle.

For example, the first part has a first receptacle engagement device and the second part has a second receptacle engagement device that are secured together in the closed position and rotatably mounted relative to the helicoidal ramp arrangement and to the connector member. The first and second engagement devices may be driven in rotation by an actuator connected to at least one of the first and second engagement devices, in particular by a motor such as a motor secured to a base by a support. Optionally, the support fixes one of the first and second receptacle engagement devices via a rotational bearing.

The ramp arrangement may be rotatably mounted on a base on which the first part is mounted. The second part can be movable towards and away from the base.

Another aspect of the invention relates to a beverage preparation device that comprises a receptacle holding unit as described above.

A further aspect of the invention relates to a combination of a receptacle containing a beverage ingredient and: a receptacle holding unit as described above; or a beverage preparation device as described above.

Yet another aspect of the invention relates to a use of a receptacle containing a beverage ingredient for a receptacle holding unit as described above or for a beverage preparation device as described above or for providing a combination of a receptacle and a unit as described above.

The receptacle may be in the form of a capsule that has a flange, e.g. a rim, that can be secured inbetween the first and second parts. The capsule may have a body that is symmetric or asymmetric, conical or frusto-conical or cylindrical or spherical or hemispherical or frusto-spherical, containing the ingredient, e.g. ground coffee, tea or cacao or another beverage ingredient.

BRIEF DESCRIPTION OF THE DRAWINGS

The invention will now be described with reference to the schematic drawings, wherein:

FIGS. 3a to 3c show perspective and partly cut-away views of a receptacle holding unit fitted with the driving device of FIG. 2.

DETAILED DESCRIPTION

Figure 1:
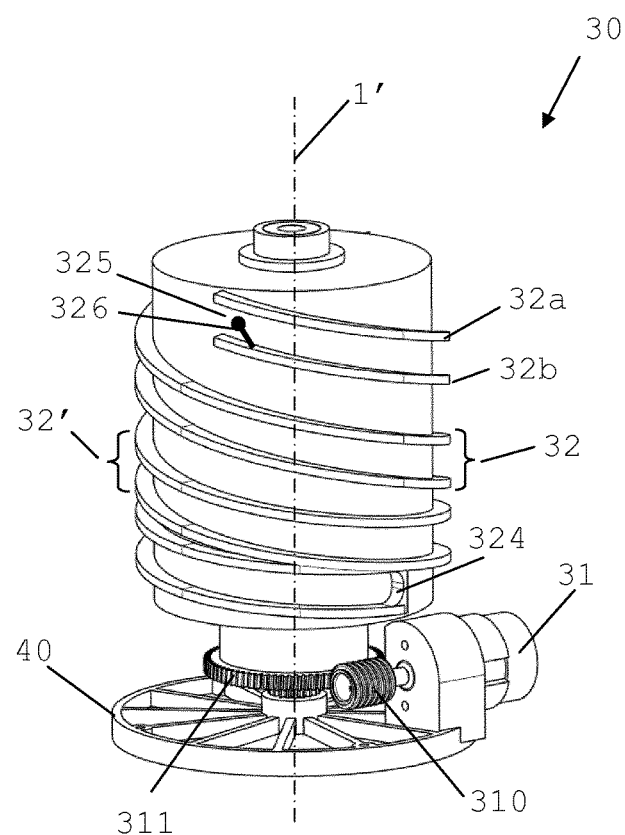
FIG. 1 illustrates part of a driving device of a receptacle holding unit in accordance with the invention.

FIGS. 1 to 4c illustrate an exemplary embodiment of a receptacle holding unit 1 and parts thereof in accordance with the invention.

Receptacle holding unit 1 can be incorporated into an ingredient processing module of a beverage preparation device, typically of the centrifugal type, e.g. as disclosed in EP 2 000 062, EP 2 155 020, EP 2 152 128, WO 2008/148646, WO 2009/106175, WO 2009/106589, WO 2010/026045, WO 2010/026053 and WO 2010/066736. Unit 1 has a seat 11' for receiving and housing an ingredient receptacle, e.g. of the type disclosed in the same references or in WO 2008/148650, WO 2008/148834, WO 2010/066705, WO 2010/063644 and WO 2011/023711. The receptacle may be of the type described above under the header "field of the invention". The receptacle may be a capsule that has a container-body, e.g. a generally cup-shaped or hemispherical or hemi-ellipsoidal body, having a rim or a flange to which a cover lid is attached, in particular sealed. Typically the receptacle contains a beverage ingredient. The invention can also be used in other fields than beverage preparation.

A beverage may be prepared by circulating a liquid into a receptacle containing a beverage ingredient which receptacle is housed in holding unit 1 and centrifugally driving such receptacle by the holding unit.

Unit 1 is usually configured to circulate a liquid into the receptacle, typically for mixing with the ingredient, e.g. brewing the ingredient, contained in the receptacle. A flavoured beverage may be prepared by circulating a carrier liquid, such as water, into the receptacle for mixing the carrier with the ingredient and form the beverage, e.g. by brewing. An automatic receptacle recognition system may be used to parameterize and adjust the processing of the ingredient automatically in line with the type of ingredient.

When closed or partly-closed receptacles of flavouring ingredients, e.g. ingredient capsules, are used, unit 1 may include a receptacle opener 211 such as blades and/or a tearing tool that may be centrally arranged (e.g. on axis 1') and/or peripherally arranged (e.g. about axis 1'). Alternatively, receptacle may be a partly or fully self-opening capsule, e.g. under the effect of centrifugation and/or pressure of liquid circulated into the receptacle. The receptacle may be of the open-type, in which case no opener is needed.

Typically, a beverage preparation device comprising unit 1 of the invention further includes one or more of the following components:

a) a fluid system in which unit 1 is in fluid communication;

b) an in-line heater for heating a flow of liquid circulated through unit 1 or a batch heater for circulating heated liquid from the batch heater to unit 1;

c) a pump for pumping liquid to unit 1, in particular a low pressure pump e.g. within the range of 1 to 5 bar, such as 1.5 to 3 bar;

d) a motor for driving unit 1 in rotation during beverage preparation;

e) an electric control unit, in particular comprising a printed circuit board (PCB), for receiving instructions from a user via an input user-interface and for controlling the heater, pump and motor(s); and/or f) one or more sensors for sensing at least one characteristic selected from characteristics of fluid system including unit 1, the heater, the pump, a liquid tank, an ingredient collector, a flow of the liquid (e.g. by a flowmeter), a pressure of the liquid and a temperature of the liquid, and for communicating such characteristic(s) to the control unit.

Moreover, receptacle holding unit 1 is typically associated with a beverage collection and dispensing system, e.g. as disclosed in WO 2009/106175 and WO 2010/089329.

Receptacle holding unit 1 comprises: a first part 10 and a second part 20 cooperating with first part 10 as well as a cavity 11' for receiving such receptacle, the cavity being delimited by at least one of first and second parts 10,20. Typically cavity 11' has a shape that generally matches the receptacle or that can at least surround the receptacle. For instance, cavity 11' is delimited by recessed wall(s) of first part 10 and covered by second part 20 that forms a lid on the recessed wall(s).

Furthermore, holding unit 1 has a driving device 30 for relatively moving second part 20:

towards first part 10, in particular along a longitudinal axis 1', into a closed position for securing the receptacle in the cavity 11'; and relatively apart from first part 10, in particular along a longitudinal axis 1', into an open position for inserting the receptacle into the cavity 11' and/or for removing the receptacle therefrom.

Driving device 30 comprises an actuator 31 and a transmission 22,32 that has a helicoidal ramp arrangement 32 cooperating with a connector member 22 for converting a translational movement into a rotational movement or vice versa. Helicoidal ramp arrangement 32 is mounted to first part 10 and connector member 22 is mounted to second part 20 so that, when actuator 31 actuates transmission 22,32, first and second parts 10,20 are driven together or apart by helicoidal ramp arrangement 32 cooperating with connector member 22. Optionally, the driving device 30 comprises a plurality of pairs 22,32; 22,32' formed of a helicoidal ramp arrangement 32,32' and a connector member 22,22'. For instance, driving device 30 has two such pairs 22,32; 22,32' or three or four such pairs.

Ramp arrangement 32,32' may be mounted on integral with a cylindrical frame 320 that can be rotatably mounted on a base 40.

Figure 2:
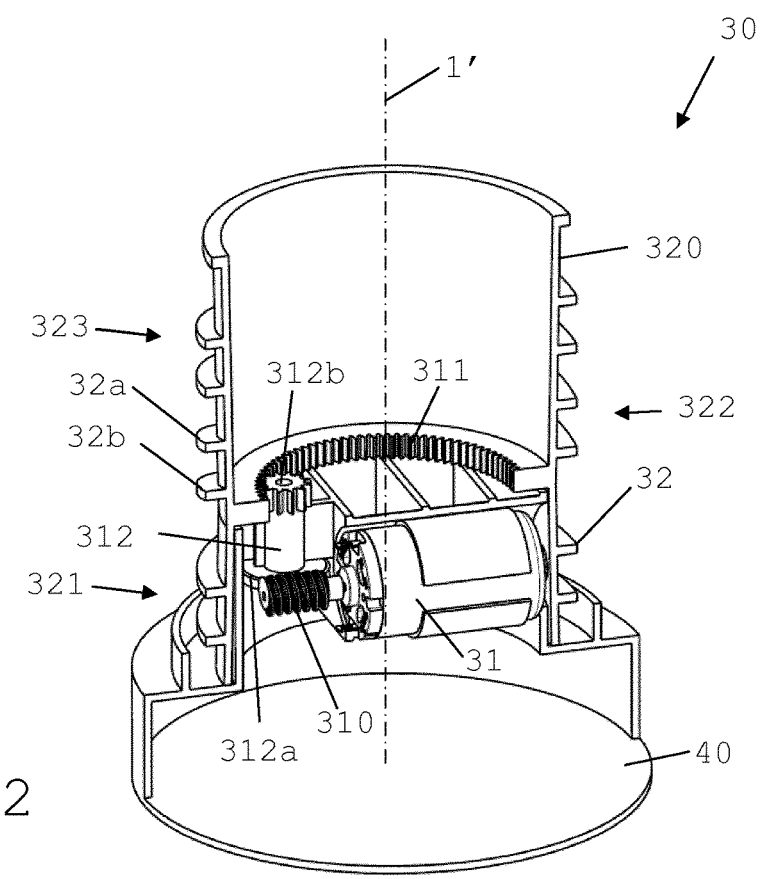
FIG. 2 illustrates a variation of the embodiment illustrated in FIG. 1.

In the exemplified embodiment, ramp arrangement 32,32' is driven in rotation by actuator 31, e.g. an electric motor. For instance, actuator 31 drives ramp arrangement via a worm drive 310,311 formed of a helical gear 310 fixed to actuator 31 and a spur gear 311 fixed to helicoidal arrangement 32,32' (FIG. 1) or via a worm drive 310,312a driving a connection rod 312 fixed to a pinion 312b that engages with a wheel 311 fixed to helicoidal arrangement 32,32' (FIG. 2). Actuator 31 is typically fixed to a base 40, ramp arrangement 32,32' being rotatably mounted on base 40.

Connector member 22,22' can be driven by rotatable ramp arrangement 32,32' that rotates and thus pushes or pulls member 22,22'. In particular, connector member 22,22' may be arranged to move along axial direction 1' of ramp arrangement 32,32'. For instance connector member 22' is mounted on a frame 23 of second part 20, frame 23 being prevented from rotating about direction 1'. For example, frame 23 is arranged to translate along axis 1' and/or pivot away or towards axis 1'.

In FIGS. 3a to 3c, a bottom end of frame 23 (right-hand foot of frame 23) has been cut-away for the purpose of illustrating the presence of connector member 22.

Helicoidal ramp arrangement 32 has a first portion 321 with a smaller slope and a second portion 322 with a greater slope for adjusting the transmission speed and force between ramp arrangement 32 and the connector member 22 to adjust a resulting speed and force of the first and second parts 10,20 moving between their open and closed positions.

The speed and force of first and second parts 10,20 may be adjusted according to the required need in particular by adjusting the slope of ramp arrangement 32 cooperating with connecting member 22. For instance, when a receptacle needs to be pierced, force is more important than speed. When first and second portions are moved from a first spacing to a second spaced during which no particular force is required, speed may be more important than force. At the end of the movement of first and second parts 10,20 the speed should be reduced to avoid a shock at the end of the travel.

Figure 4A:
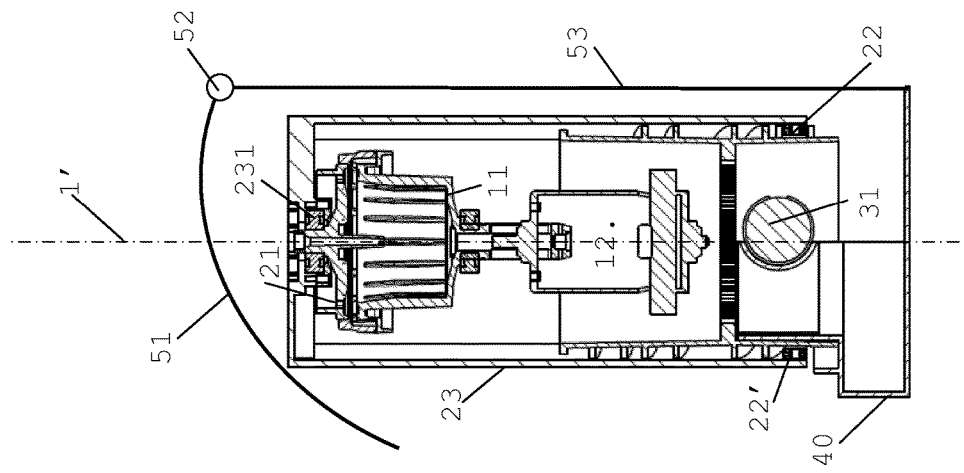
FIGS. 4a to 4c show cross-sectional views of the embodiment shown in FIGS. 3a to 3c.

First portion 321 of smaller slope may form an end portion of ramp arrangement 32,32' which contacts the connector member 22,22' in the open position (FIGS. 3a and 4a). Such a slope reduction at the end of ramp arrangement 32,32' reduces the translational speed of connector member 22,22' relative to the angular speed of the ramp arrangement and increases the force transmitted by connector member 22,23' relative to the torque of the rotating ramp arrangement.

Ramp arrangement 32 may comprise a second portion 322 having a slope that is greater than the smaller slope of first portion 321. Such a slope increase of ramp arrangement 32,32' increases the translational speed of connector member 22,22' relative to the angular speed of the ramp arrangement 32,32' and reduces the force transmitted by connector member 22,23' relative to the torque of the rotating ramp arrangement.

Second portion 322 typically extends from first portion 321 and forms at least a middle portion of ramp arrangement 32.

Ramp arrangement 32 may comprise a third portion 323 having a slope that is smaller than the greater slope of second portion 322, in particular a slope that is equal to the smaller slope of first portion 321. For instance, third portion 323 forms an end portion of ramp arrangement 32 that is opposite to first portion 321. Likewise, such a slope reduction at the end of ramp arrangement 32,32' reduces the translational speed of connector member 22,22' relative to the angular speed of the ramp arrangement and increases the force transmitted by connector member 22,23' relative to the torque of the rotating ramp arrangement.

First, second and third portions 321,322,323 may have slopes and pitches in the ranges described above in the Summary of the Invention.

First and second parts 10,20 can be permanently mechanically linked together during the normal use of unit 1 (excluding servicing or repairing operations involving a dismantling of unit 1).

In the exemplified embodiment, ramp arrangement 32 comprises two spaced apart and generally parallel first and second ramps 32a,32b inbetween which connector member relatively moves along ramp arrangement 32. Hence, member 22 is secured between two ramps 32a,32b so as to avoid significant translation displacement of member 22 that would be independent from a rotation of ramp arrangement 32. Furthermore, depending on the forces exercised, member 22 may be urged or rest either against ramp 32a (e.g. when member 22 is pulled or retained upwards) or against ramp 32b (e.g. when member 22 is puller or retained downwards. The spacing between the facing ramps 32a,32b or their facing surfaces may be varied to facilitate or slow down the passage of connector member 22. For instance, ramps 32a,32b may squeeze and block connector member 22 when it reaches an end position inbetween ramps 32a, 32b.

Figure 4B:
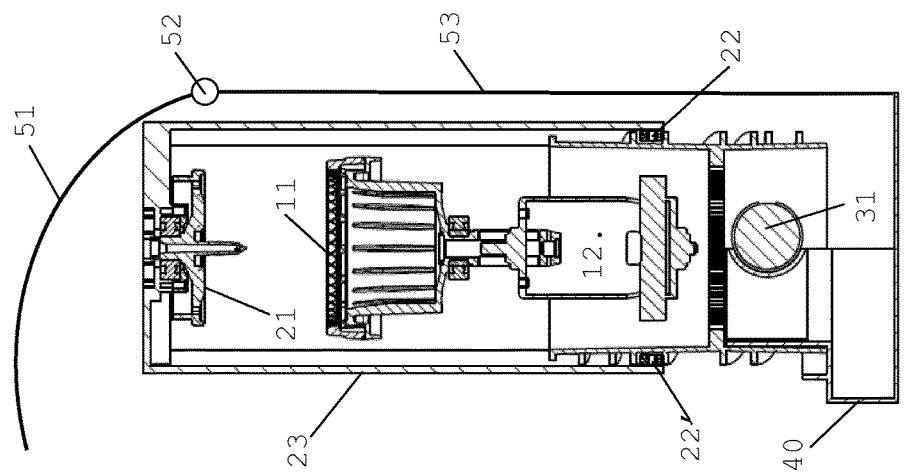
Figure 4C:
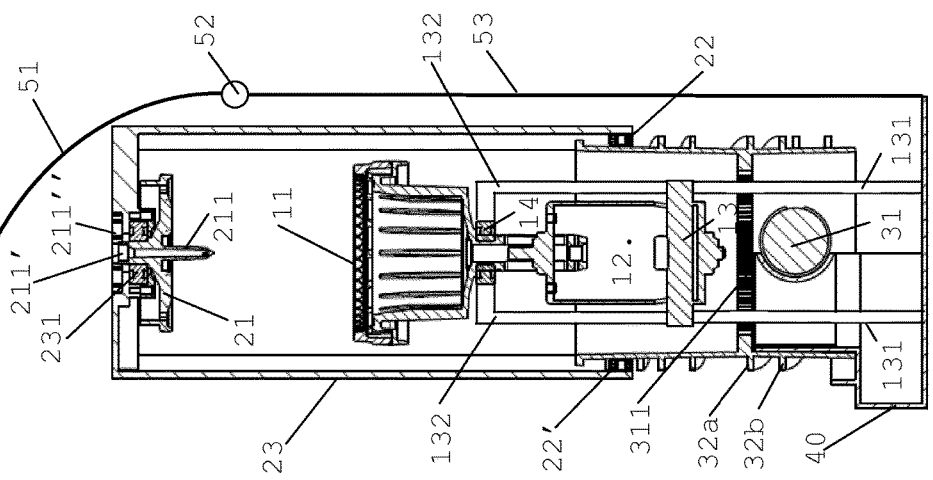

For instance, connector member 22 can be urged against first ramp 32a in the closed position (FIGS. 3c and 4c). As schematically illustrated in FIGS. 4a to 4c, connector member 22 may be urged against first ramp 32a during (at least part of) closure to pull a movable cover part 51 connected to first or second part 10,20 from an open position into a closed position such as a cover part that is biased into an open position by a resilient device 52 connected to a cover support 53. Even in such a case, connector member 22 may rest on second ramp 32b in the open position, e.g. if resilient device 52 is sufficiently relaxed in this position. Cover 51 may be connected to first part 10 or second part 20, e.g. by a resilient member or by a cam-follower and cam mechanism (not shown) so that cover 51 follows the relative movement of first and second parts 10,20. Cover support 53 may be fixed or assembled to base 40.

Connector member 22 can rest on second ramp 32b when first and second parts 10,20 are moved between the open and closed positions. Optionally connector member 22 rests on second ramp 32b in the open position.

Driving device 30 may have a controller for controlling actuator 31, the controller being configured to detect when connector member 22 reaches an end position 324,325 on helicoidal ramp arrangement 32 and stop actuator 31, in particular at an end position 324,325 along ramp arrangement 32 corresponding to the open or the closed position. Optionally, ramp arrangement 32 is associated with one or more end position switches 326 that are connected to the controller for detecting the presence of connector member 32 at end position 325 or the controller is arranged to monitor a parameter, such as the current or the voltage, of a power consumption of actuator 31 to determine the presence of connector member 32 at end position 324, e.g. the ramp arrangement 32 includes a wall for stopping connector member 22 at end position 324.

First and second parts 10,20 can be secured in the open position (FIGS. 3a and 4a) or the closed position (FIGS. 3c and 4c) by maintaining actuator 31 of driving device 30 activated.

Transmission 22,32 can be a one-way transmission that prevents first and second parts 10,20 from moving between the open and the closed positions without correspondingly powering actuator 31 of driving device 30. In such a case, it is not necessary to maintain a powering of the actuator 31 in the closed position.

Hence, it is possible but not required, to use a fastening device, such as a latch or a lock or equivalent means, to secure first and second parts 10,20 in a closed position during beverage preparation, e.g. to resist a pressure rise urging first and second parts 10,20 apart.

First and second parts 10,20 can be relatively moved along path 1' from the open position to the closed position, first part 10 and helicoidal ramp arrangement 32 being movable as a unit along path 1' and/or second part 20 and connector member 22 being movable as a unit along path 1'. Helicoidal ramp arrangement 32 can be rotatably mounted about path 1' to the first part 10. In this case, movable as a "unit" means that the elements follow each other at a generally constant distance when moved along path 1', the elements being allowed to move relative to each other in a direction different to the direction of path 1', for example they can relatively pivot about path 1'.

First and second parts 10,20 can be relatively moved along path 1' from the open to the closed position, the helicoidal ramp arrangement 32 being rotatable about path 1' and connector member 22 being translatable along path 1' or vice versa.

As mentioned above, second part can have a frame 23 to which connector member 22 is mounted. For example, connector member 22 forms a toothed or plain wheel cooperating with ramp arrangement 32 that is optionally correspondingly toothed or plain. In an alternative embodiment, connector member 22 may be fixed to frame 23 and slide along ramp arrangement 32.

First part 10 may have a first receptacle engagement device 11 that is rotatable about an axis 1' which is generally parallel, in particular identical, to axis 1' of helicoidal ramp arrangement 32.

Second part 20 has a second receptacle engagement device 21 that is rotatably mounted to connector member 22, in particular via a frame 23 and/or a ball bearing 231. Optionally, second receptacle engagement device 21 comprises or defines a fluid outlet 211 for circulating a fluid to a receptacle contained in cavity 11' and/or comprises or defines a fluid outlet for guiding an extract from a receptacle contained in cavity 11'. Fluid outlet 211 may be connected to a fluid line 211' that is joined to outlet 211 via a rotatable seal 211".

For instance, second receptacle engagement device 21 is provided with one or more peripheral piercing members (not shown) to form one or more corresponding openings at a periphery of a receptacle. By mounting engagement device 21 on a pivotable bearing 231, engagement device 21 can follow a rotation of the receptacle during piercing so that the receptacle is not laterally torn by a relative rotation of such peripheral piercing member(s) penetrating into or located in the receptacle.

First part 10 may have a first receptacle engagement device 11 and second part 20 can have a second receptacle engagement device 21. First and second receptacle engagement devices 11,21 may be static or dynamic during beverage preparation. For instance, engagement devices 11,21 are arranged to rotate, e.g. centrifuged, in particular at elevated speed, e.g. above 1000 or 2000 RPM, to enhance processing of the ingredient in the receptacle, in particular mixing thereof with a liquid circulated into the receptacle. In the latter configuration, engagement devices 11,21 move together into the closed position in a manner to be angularly fixed one to another about axis 1' of relative rotation. Axis 1' of relative rotation of connector member 22 and ramp arrangement 32 may be the same as or different to the axis of the ingredient processing rotation.

A first engagement device 11 and a second engagement device 21 may be provided with an (angular) fastening arrangement, e.g. a first peripheral profile 112 and a second peripheral profile 212 that cooperate with first profile 112 to prevent relative rotation of first and second engagement devices 11,21 when in the closed position. Such a fastening may prove to be particularly useful if first and second engagement devices 11,21 are rotated during the ingredient processing.

Hence, in an embodiment, first part 10 has a first receptacle engagement device 11 and second part 20 has a second receptacle engagement device 21 that are secured together in the closed position and rotatably mounted relative to ramp arrangement 32 and to connector member 22. In this embodiment, first and second engagement devices 11,21 are driven in rotation by an actuator 12 connected and driving at least one of first and second engagement devices 11,21 (the other engagement device being driven by the companion engagement device), in particular by a motor 12, such as a motor 12 secured to a base 40 by a support 13. Optionally support 13 fixes one of first and second receptacle engagement devices 11,21 via a rotational bearing 14. For example, support 13 is fixed to base 40 by one or more legs 131 (as illustrated in FIG. 4a). Bearing 14 may be fixed to support 13 by one or more arms 132 (as illustrated in FIG. 4a).

Ramp arrangement 32 may be rotatably mounted on a base 40 on which first part 10 is mounted, the second part 20 being movable towards and away from base 40 by the action of transmission 22,32.

As mentioned above, receptacle may be in the form of a capsule that has a flange, e.g. a rim, that can be secured inbetween first and second parts 10,20. The capsule may have a body that is, symmetric or asymmetric, conical or frusto-conical or cylindrical or spherical or hemispherical or frusto-spherical or domical or frusto-domical, containing the ingredient, e.g. ground coffee, tea or cacao or another beverage ingredient.

The invention claimed is:

1. A receptacle holding unit for a device for preparing a beverage from an ingredient contained in a receptacle by circulating a liquid into the receptacle and centrifugally driving the receptacle, the receptacle holding unit comprising:
   a first part and a second part cooperating with the first part;
   a cavity for receiving the receptacle, the cavity being defined by at least one of the first part and the second part; and
   a driving device for relatively moving the second part towards the first part, into a closed position for securing the receptacle in the cavity and relatively apart from the first part into an open position for inserting the receptacle into the cavity and/or for removing the receptacle therefrom,
   the driving device comprising an actuator and a transmission that has a helicoidal ramp arrangement cooperating with a connector member for converting a translational movement into a rotational movement or vice versa, and the helicoidal ramp arrangement being mounted to the first part and the connector member being mounted to the second part so that, when the actuator actuates the transmission, the first part and the second part are driven together or apart by the helicoidal ramp arrangement cooperating with the connector member,
   the driving device comprising a plurality of pairs of the helicoidal ramp arrangement cooperating and the connector member, and/or the first part and the second part being secured in the open position or the closed position by maintaining the actuator of the driving device activated,
   the helicoidal ramp arrangement comprises a first ramp and a second ramp that are spaced apart and generally parallel and between which the connector member relatively moves along the helicoidal ramp arrangement, and the connector member is urged against the first ramp in the closed position and against the second ramp in the open position.

2. The receptacle holding unit of claim 1, wherein the connector member rests on the second ramp when the first part and the second part are moved between the open position and the closed position.

3. The receptacle holding unit of claim 1, wherein the transmission is a one-way transmission that prevents the first part and the second part from moving between the open positions and the closed position without correspondingly powering the actuator of the driving device.

4. The receptacle holding unit of claim 1, wherein the first part and the second part are relatively moved along a path from the open position to the closed position, the first part and the helicoidal ramp arrangement being movable as a unit along the path and/or the second part and the connector member being movable as a unit along the path.

5. The receptacle holding unit of claim 1, wherein the first part and the second part are relatively moved along a path from the open position to the closed position and vice versa, the helicoidal ramp arrangement being rotatable about the path and the connector member being translatable along the path or vice versa.

6. The receptacle holding unit of claim 1, wherein the second part has a frame to which the connector member is mounted.

7. The receptacle holding unit of claim 1, wherein the first part has a first receptacle engagement device that is rotatable about an axis which is generally parallel to an axis of the helicoidal ramp arrangement.

8. The receptacle holding unit of claim 1, wherein the second part has a second receptacle engagement device that is rotatably mounted to the connector member.

9. The receptacle holding unit of claim 1, wherein the first part has a first receptacle engagement device, the second part has a second receptacle engagement device, the first receptacle engagement device and the second receptacle engagement device are secured together in the closed position and rotatably mounted relative to the helicoidal ramp arrangement and to the connector member, the first receptacle engagement device and the second receptacle engagement device being driven in rotation by an actuator connected to at least one of the first receptacle engagement device and the second receptacle engagement device.

10. The receptacle holding unit of claim 1, wherein the helicoidal ramp arrangement is rotatably mounted on a base on which the first part is mounted, the second part being movable towards and away from the base.

11. A receptacle holding unit for a device for preparing a beverage from an ingredient contained in a receptacle by circulating a liquid into the receptacle and centrifugally driving the receptacle, the receptacle holding unit comprising:
   a first part and a second part cooperating with the first part;
   a cavity for receiving the receptacle, the cavity being defined by at least one of the first part and the second part; and
   a driving device for relatively moving the second part towards the first part, into a closed position for securing the receptacle in the cavity and relatively apart from the first part into an open position for inserting the receptacle into the cavity and/or for removing the receptacle therefrom,
   the driving device comprising an actuator and a transmission that has a helicoidal ramp arrangement cooperating with a connector member for converting a translational movement into a rotational movement or vice versa, the helicoidal ramp arrangement being mounted to the first part and the connector member being mounted to the second part so that, when the actuator actuates the transmission, the first part and the second part are driven together or apart by the helicoidal ramp arrangement cooperating with the connector member,
   the helicoidal ramp arrangement comprises a first ramp and a second ramp that are spaced apart and generally parallel and between which the connector member relatively moves along the helicoidal ramp arrangement, the connector member is urged against the first ramp in the closed position and against the second ramp in the open position, and the connector member is urged against the first ramp during closure to pull a movable cover part connected to the first part or the second part from the open position into the closed position.

12. The receptacle holding unit of claim 11, wherein the movable cover part is biased into the open position by a resilient device connected to a cover support.

13. A receptacle holding unit for a device for preparing a beverage from an ingredient contained in a receptacle by circulating a liquid into the receptacle and centrifugally driving the receptacle, the receptacle holding unit comprising:
- a first part and a second part cooperating with the first part;
- a cavity for receiving the receptacle, the cavity being defined by at least one of the first part and the second part; and
- a driving device for relatively moving the second part towards the first part, into a closed position for securing the receptacle in the cavity and relatively apart from the first part into an open position for inserting the receptacle into the cavity and/or for removing the receptacle therefrom,
- the driving device comprising an actuator and a transmission that has a helicoidal ramp arrangement cooperating with a connector member for converting a translational movement into a rotational movement or vice versa, the helicoidal ramp arrangement being mounted to the first part and the connector member being mounted to the second part so that, when the actuator actuates the transmission, the first part and the second part are driven together or apart by the helicoidal ramp arrangement cooperating with the connector member,
- the helicoidal ramp arrangement comprises a first ramp and a second ramp that are spaced apart and generally parallel and between which the connector member relatively moves along the helicoidal ramp arrangement, and the helicoidal ramp arrangement has a first portion with a smaller slope and a second portion with a greater slope for adjusting a transmission speed and force between the helicoidal ramp arrangement and the connector member to adjust a resulting speed and force of the first part and the second part moving between the open position and the closed position.

14. A receptacle holding unit for a device for preparing a beverage from an ingredient contained in a receptacle by circulating a liquid into the receptacle and centrifugally driving the receptacle, the receptacle holding unit comprising:
- a first part and a second part cooperating with the first part;
- a cavity for receiving the receptacle, the cavity being defined by at least one of the first part and the second part; and
- a driving device for relatively moving the second part towards the first part, into a closed position for securing the receptacle in the cavity and relatively apart from the first part into an open position for inserting the receptacle into the cavity and/or for removing the receptacle therefrom,
- the driving device comprising an actuator and a transmission that has a helicoidal ramp arrangement cooperating with a connector member for converting a translational movement into a rotational movement or vice versa, the helicoidal ramp arrangement being mounted to the first part and the connector member being mounted to the second part so that, when the actuator actuates the transmission, the first part and the second part are driven together or apart by the helicoidal ramp arrangement cooperating with the connector member,
- the helicoidal ramp arrangement comprises a first ramp and a second ramp that are spaced apart and generally parallel and between which the connector member relatively moves along the helicoidal ramp arrangement, the connector member is urged against the first ramp in the closed position and against the second ramp in the open position, the connector member rests on the second ramp when the first part and the second part are moved between the open position and the closed position, and the first portion forms an end portion of the helicoidal ramp arrangement which contacts the connector member in the open position or the closed position, the helicoidal ramp arrangement comprising a third portion having a slope that is less than the greater slope of the second portion.

15. A receptacle holding unit for a device for preparing a beverage from an ingredient contained in a receptacle by circulating a liquid into the receptacle and centrifugally driving the receptacle, the receptacle holding unit comprising:
- a first part and a second part cooperating with the first part;
- a cavity for receiving the receptacle, the cavity being defined by at least one of the first part and the second part; and
- a driving device for relatively moving the second part towards the first part, into a closed position for securing the receptacle in the cavity and relatively apart from the first part into an open position for inserting the receptacle into the cavity and/or for removing the receptacle therefrom,
- the driving device comprising an actuator and a transmission that has a helicoidal ramp arrangement cooperating with a connector member for converting a translational movement into a rotational movement or vice versa, the helicoidal ramp arrangement being mounted to the first part and the connector member being mounted to the second part so that, when the actuator actuates the transmission, the first part and the second part are driven together or apart by the helicoidal ramp arrangement cooperating with the connector member,
- the helicoidal ramp arrangement comprises a first ramp and a second ramp that are spaced apart and generally parallel and between which the connector member relatively moves along the helicoidal ramp arrangement, and the driving device has a controller for controlling the actuator, the controller being configured to detect when the connector member reaches an end position on the helicoidal ramp arrangement and stop the actuator.

16. A receptacle holding unit for a device for preparing a beverage from an ingredient contained in a receptacle by circulating a liquid into the receptacle and centrifugally driving the receptacle, the receptacle holding unit comprising:
- a first part and a second part cooperating with the first part;

a cavity for receiving the receptacle, the cavity being defined by at least one of the first part and the second part; and a driving device for relatively moving the second part towards the first part, into a closed position for securing the receptacle in the cavity and relatively apart from the first part into an open position for inserting the receptacle into the cavity and/or for removing the receptacle therefrom, the driving device comprising an actuator and a transmission that has a helicoidal ramp arrangement cooperating with a connector member for converting a translational movement into a rotational movement or vice versa, the helicoidal ramp arrangement being mounted to the first part and the connector member being mounted to the second part so that, when the actuator actuates the transmission, the first part and the second part are driven together or apart by the helicoidal ramp arrangement cooperating with the connector member, the helicoidal ramp arrangement comprises a first ramp and a second ramp that are spaced apart and generally parallel and between which the connector member relatively moves along the helicoidal ramp arrangement, and the first part and the second part are secured in the open position or the closed position by maintaining the actuator of the driving device activated.

17. A beverage preparation device comprising a receptacle holding unit for preparing a beverage from an ingredient contained in a receptacle by circulating a liquid into the receptacle and centrifugally driving the receptacle, the receptacle holding unit comprising: a first part and a second part cooperating with the first part; a cavity for receiving the receptacle, the cavity being defined by at least one of the first part and the second part; and a driving device for relatively moving the second part towards the first part, into a closed position for securing the receptacle in the cavity and relatively apart from the first part into an open position for inserting the receptacle into the cavity and/or for removing the receptacle therefrom, the driving device comprising an actuator and a transmission that has a helicoidal ramp arrangement cooperating with a connector member for converting a translational movement into a rotational movement or vice versa, the helicoidal ramp arrangement being mounted to the first part and the connector member being mounted to the second part so that, when the actuator actuates the transmission, the first part and the second part are driven together or apart by the helicoidal ramp arrangement cooperating with the connector member, the driving device comprising a plurality of pairs of the helicoidal ramp arrangement cooperating and the connector member, and/or the first part and the second part being secured in the open position or the closed position by maintaining the actuator of the driving device activated, the helicoidal ramp arrangement comprises a first ramp and a second ramp that are spaced apart and generally parallel and between which the connector member relatively moves along the helicoidal ramp arrangement.

18. A combination of a receptacle containing a beverage ingredient and a receptacle holding unit comprising a device for preparing a beverage from the beverage ingredient contained in the receptacle by circulating a liquid into the receptacle and centrifugally driving the receptacle, the receptacle holding unit comprising: a first part and a second part cooperating with the first part; a cavity for receiving the receptacle, the cavity being defined by at least one of the first part and the second part; a driving device for relatively moving the second part towards the first part, into a closed position for securing the receptacle in the cavity and relatively apart from the first part into an open position for inserting the receptacle into the cavity and/or for removing the receptacle therefrom, the driving device comprising an actuator and a transmission that has a helicoidal ramp arrangement cooperating with a connector member for converting a translational movement into a rotational movement or vice versa, and the helicoidal ramp arrangement being mounted to the first part and the connector member being mounted to the second part so that, when the actuator actuates the transmission, the first part and the second part are driven together or apart by the helicoidal ramp arrangement cooperating with the connector member, the driving device comprising a plurality of pairs of the helicoidal ramp arrangement cooperating and the connector member, and/or the first part and the second part being secured in the open position or the closed position by maintaining the actuator of the driving device activated, the helicoidal ramp arrangement comprises a first ramp and a second ramp that are spaced apart and generally parallel and between which the connector member relatively moves along the helicoidal ramp arrangement.

19. A combination of a receptacle containing a beverage ingredient and a beverage preparation device comprising a receptacle holding unit comprising a device for preparing a beverage from the ingredient contained in the receptacle by circulating a liquid into the receptacle and centrifugally driving the receptacle, the receptacle holding unit comprising: a first part and a second part cooperating with the first part; a cavity for receiving the receptacle, the cavity being defined by at least one of the first part and the second part; and a driving device for relatively moving the second part towards the first part, into a closed position for securing the receptacle in the cavity and relatively apart from the first part into an open position for inserting the receptacle into the cavity and/or for removing the receptacle therefrom the driving device comprising an actuator and a transmission that has a helicoidal ramp arrangement cooperating with a connector member for converting a translational movement into a rotational movement or vice versa, and the helicoidal ramp arrangement being mounted to the first part and the connector member being mounted to the second part so that, when the actuator actuates the transmission, the first part and the second part are driven together or apart by the helicoidal ramp arrangement cooperating with the connector member, the driving device comprising a plurality of pairs of the helicoidal ramp arrangement cooperating and the connector member, and/or the first part and the second part being secured in the open position or the closed position by maintaining the actuator of the driving device activated, the helicoidal ramp arrangement comprises a first ramp and a second ramp that are spaced apart and generally parallel and between which the connector member relatively moves along the helicoidal ramp arrangement.

* * * * *